(12) United States Patent
Beck (10) Patent No.: US 11,158,145 B2
(45) Date of Patent: Oct. 26, 2021

(54) GARAGE DOOR OPENER WITH TOUCH SENSOR AUTHENTICATION

(71) Applicant: Spectrum Brands, Inc., Middleton, WI (US)

(72) Inventor: Chasen Scott Beck, Costa Mesa, CA (US)

(73) Assignee: Spectrum Brands, Inc., Middleton, WI (US)

( * ) Notice: Subject to any disclaimer, the term of this patent is extended or adjusted under 35 U.S.C. 154(b) by 0 days.

(21) Appl. No.: 16/086,553

(22) PCT Filed: Mar. 21, 2017

(86) PCT No.: PCT/US2017/023311
§ 371 (c)(1),
(2) Date: Sep. 19, 2018

(87) PCT Pub. No.: WO2017/165349
PCT Pub. Date: Sep. 28, 2017

(65) Prior Publication Data
US 2019/0130673 A1    May 2, 2019

Related U.S. Application Data

(60) Provisional application No. 62/311,552, filed on Mar. 22, 2016.

(51) Int. Cl.
*G07C 9/00* (2020.01)
*H04W 12/06* (2021.01)
(Continued)

(52) U.S. Cl.
CPC .......... *G07C 9/0069* (2013.01); *G06F 21/34* (2013.01); *G06F 21/35* (2013.01); *G06F 21/44* (2013.01);
(Continued)

(58) Field of Classification Search
CPC .......... G06F 21/34; G06F 21/35; G06F 21/44; G06F 2203/04106; G06F 3/0219;
(Continued)

(56) References Cited

U.S. PATENT DOCUMENTS

| 3,733,861 A | 5/1973 | Lester |
| 3,794,848 A | 2/1974 | Peters et al. |

(Continued)

FOREIGN PATENT DOCUMENTS

| CN | 1317066 A | 10/2001 |
| CN | 1922353 A | 2/2007 |

(Continued)

OTHER PUBLICATIONS

International Search Report and Written Opinion for PCT/US2017/023311 (dated May 31, 2017).

(Continued)

*Primary Examiner* — Dionne Pendleton
(74) *Attorney, Agent, or Firm* — Merchant & Gould P.C.

(57) ABSTRACT

A remote control unit for a garage door having a garage door opener. The remote control unit includes a controller, at least one wireless communication unit in electrical communication with the controller and a user interface in electrical communication with the controller. In some embodiments, the user interface includes a wireless authentication activation element that is configured to detect user-actuation of the wireless authentication activation element. The controller is configured to transmit a wireless control signal to open/close a garage door responsive to receiving a valid authentication code via the wireless communication unit. Typically, the controller is configured to receive a wireless authentication code responsive to actuation of the wireless authentication activation element.

20 Claims, 5 Drawing Sheets

(51) Int. Cl.
| | |
|---|---|
| *G06F 21/44* | (2013.01) |
| *G06F 21/34* | (2013.01) |
| *H04W 80/00* | (2009.01) |
| *H04N 21/422* | (2011.01) |
| *G06F 21/35* | (2013.01) |
| *H04W 84/12* | (2009.01) |
| *H04L 12/28* | (2006.01) |

(52) U.S. Cl.
CPC ........... *G07C 9/00* (2013.01); *G07C 9/00182* (2013.01); *G07C 9/00896* (2013.01); *H04N 21/42222* (2013.01); *H04N 21/42224* (2013.01); *H04W 12/06* (2013.01); *H04W 80/00* (2013.01); *E05Y 2400/85* (2013.01); *E05Y 2900/106* (2013.01); *G07C 2009/0019* (2013.01); *G07C 2009/00769* (2013.01); *G07C 2009/00928* (2013.01); *H04L 12/2803* (2013.01); *H04W 84/12* (2013.01)

(58) Field of Classification Search
CPC .... G06F 3/03547; G06F 3/041; G06F 3/0414; G06F 3/044; G06F 3/017; G06F 3/033; G06F 3/0338; G07C 2009/0019; G07C 2009/00769; G07C 2009/00928; G07C 9/00; G07C 9/00182; G07C 9/0069; G07C 9/00896; G07C 2009/00888; G07C 2009/00507; G07C 2009/00753; G07C 2009/00761; G07C 2009/00793; G07C 2009/00849; G07C 2009/00865; G07C 9/00309; G07C 9/00571; G07C 9/00857; G07C 9/30; G07C 2209/62; G07C 9/00563; G07C 2209/63; H04L 12/2803; H04W 12/06; H04W 84/12; G08C 17/02; G08C 2201/20; G08C 17/00; G08C 2201/62; G08C 2201/91; G08C 2201/93; H01H 25/041; H01H 9/0235; A47K 13/24; A47K 13/302; E03D 9/08; E05B 43/005; G05B 19/048; G05B 2219/25011; G05G 2009/04703; G05G 2009/04755; G05G 5/05; G05G 9/02; G05G 9/047; G06K 9/00013; G06K 9/00228; G06K 9/00342; G06K 9/00771; G08B 13/22; G08B 13/2491; G08B 17/117; G08B 25/008; G08B 25/14; H01R 12/724; H01R 13/2407; H01R 13/447; H01R 13/6275; H01R 2107/00; H01R 24/62; H02G 3/081; H02G 3/12; H02G 3/16; H03K 17/97; H04Q 9/00; H05B 47/105; H05B 47/19; H01Q 1/3241; H01Q 5/321; H01Q 5/371; H01Q 5/40; H01Q 7/00; B60R 16/02; B60R 25/00; B60R 25/24; H04N 21/42204; H04N 21/42222; H04N 21/4415; H04N 21/44222; H04N 21/4532; H04N 5/4403

See application file for complete search history.

(56) References Cited

U.S. PATENT DOCUMENTS

| | | |
|---|---|---|
| RE29,341 E | 8/1977 | Peters et al. |
| 4,439,808 A | 3/1984 | Gillham |
| 4,485,381 A | 11/1984 | Lewiner et al. |
| 4,573,720 A | 3/1986 | Nicolai |
| 4,685,316 A | 8/1987 | Hicks et al. |
| 4,763,937 A | 8/1988 | Sittnick, Jr. et al. |
| 5,000,497 A | 3/1991 | Geringer et al. |
| 5,029,912 A | 7/1991 | Gotanda |
| 5,088,779 A | 2/1992 | Weiss |
| 5,247,282 A | 9/1993 | Marshall |
| 5,261,260 A | 11/1993 | Lin |
| 5,386,713 A | 2/1995 | Wilson |
| 5,392,025 A | 2/1995 | Figh et al. |
| 5,429,399 A | 7/1995 | Geringer et al. |
| 5,474,342 A | 12/1995 | Smith et al. |
| 5,712,626 A | 1/1998 | Andreou et al. |
| 5,715,712 A | 2/1998 | West |
| 5,729,198 A | 3/1998 | Gorman |
| 5,799,518 A | 9/1998 | Du |
| 5,920,268 A | 7/1999 | Bucci et al. |
| 5,926,106 A | 7/1999 | Beran et al. |
| 5,933,086 A | 8/1999 | Tischendorf et al. |
| 5,936,544 A | 8/1999 | Gonzales et al. |
| 5,943,888 A | 8/1999 | Lawson |
| 5,987,818 A | 11/1999 | Dabideen |
| 5,996,383 A | 12/1999 | Adelmeyer et al. |
| 6,005,306 A | 12/1999 | Pickard |
| 6,034,617 A | 3/2000 | Luebke et al. |
| 6,112,563 A | 9/2000 | Ramos |
| 6,128,933 A | 10/2000 | Mirshafiee et al. |
| 6,271,751 B1 | 8/2001 | Hunt et al. |
| 6,297,725 B1 | 10/2001 | Tischendorf et al. |
| 6,323,782 B1 | 11/2001 | Stephens et al. |
| 6,725,127 B2 | 4/2004 | Stevens |
| 6,886,380 B2 | 5/2005 | Kato et al. |
| 6,957,767 B2 | 10/2005 | Aupperle et al. |
| 6,967,562 B2 | 11/2005 | Menard et al. |
| 6,976,919 B2 | 12/2005 | Cole |
| 7,023,319 B2 | 4/2006 | Hwang |
| RE39,144 E | 6/2006 | Pickard |
| 7,113,070 B2 | 9/2006 | Deng et al. |
| 7,165,428 B2 | 1/2007 | Isaacs et al. |
| 7,239,238 B2 | 7/2007 | Tester et al. |
| 7,248,836 B2 | 7/2007 | Taylor |
| 7,249,705 B2 | 7/2007 | Dudley |
| 7,289,764 B2 | 10/2007 | Gonzales et al. |
| 7,296,448 B1 | 11/2007 | Shaw |
| 7,304,572 B2 | 12/2007 | Sheynman et al. |
| 7,334,443 B2 | 2/2008 | Meekma et al. |
| 7,346,331 B2 | 3/2008 | Taylor et al. |
| 7,346,439 B2 | 3/2008 | Bodin |
| 7,378,939 B2 | 5/2008 | Sengupta et al. |
| 7,389,661 B2 | 6/2008 | Viviano et al. |
| 7,391,319 B1 | 6/2008 | Walker |
| 7,446,644 B2 | 11/2008 | Schaffzin et al. |
| 7,471,191 B2 | 12/2008 | Le Gars |
| 7,481,471 B2 | 1/2009 | Andersen et al. |
| 7,624,280 B2 | 11/2009 | Oskar |
| 7,696,878 B2 | 4/2010 | Cable et al. |
| 7,701,331 B2 | 4/2010 | Tran |
| 7,747,286 B2 | 6/2010 | Conforti |
| 7,828,345 B2 | 11/2010 | Terry et al. |
| 7,828,346 B2 | 11/2010 | Terry et al. |
| 7,845,201 B2 | 12/2010 | Meyerle et al. |
| 7,849,721 B2 | 12/2010 | Bass et al. |
| 7,908,896 B1 | 3/2011 | Olson et al. |
| 7,952,477 B2 | 5/2011 | Fogg |
| 7,967,459 B2 | 6/2011 | Schluep et al. |
| 7,973,657 B2 | 7/2011 | Ayed |
| 7,994,925 B2 | 8/2011 | Lahiri |
| 7,999,656 B2 | 8/2011 | Fisher |
| 8,002,180 B2 | 8/2011 | Harper et al. |
| 8,011,217 B2 | 9/2011 | Marschalek et al. |
| 8,026,792 B2 | 9/2011 | Powers et al. |
| 8,026,816 B2 | 9/2011 | Chao Cheng |
| 8,035,478 B2 | 10/2011 | Lee |
| 8,035,479 B2 | 10/2011 | Tran |
| 8,069,693 B2 | 12/2011 | Powers et al. |
| 8,074,481 B2 | 12/2011 | Bass et al. |
| 8,079,240 B2 | 12/2011 | Brown et al. |
| 8,093,986 B2 | 1/2012 | Harvey |
| 8,106,752 B2 | 1/2012 | Golden |
| 8,115,609 B2 | 2/2012 | Ketari |
| 8,240,085 B2 | 8/2012 | Hill |
| 8,264,329 B2 | 9/2012 | Roberts et al. |
| 8,272,241 B2 | 9/2012 | Brown et al. |
| 8,292,337 B2 | 10/2012 | Chang |

(56) References Cited

U.S. PATENT DOCUMENTS

| | | |
|---|---|---|
| 8,347,659 B2 | 1/2013 | Powers et al. |
| 8,358,197 B2 | 1/2013 | Tran |
| 8,358,198 B2 | 1/2013 | Harper et al. |
| 8,360,307 B2 | 1/2013 | Rudduck et al. |
| 8,555,684 B1 | 10/2013 | Chen |
| 8,643,469 B2 | 2/2014 | Haberli |
| 8,683,833 B2 | 4/2014 | Marschalek et al. |
| 8,692,650 B2 | 4/2014 | Pollabauer |
| 8,701,353 B2 | 4/2014 | Patel et al. |
| 8,925,982 B2 | 1/2015 | Bliding et al. |
| 9,024,759 B2 | 5/2015 | Uyeda et al. |
| 9,085,919 B2 | 7/2015 | Bacon |
| 9,151,096 B2 | 10/2015 | Hunt et al. |
| 9,322,194 B2 | 4/2016 | Cheng et al. |
| 9,340,999 B2 | 5/2016 | Romero |
| 9,359,794 B2 | 6/2016 | Cheng |
| 9,382,739 B1 | 7/2016 | Johnson et al. |
| 9,424,700 B2 | 8/2016 | Lovett et al. |
| 9,447,604 B2 | 9/2016 | Witte et al. |
| 9,528,294 B2 | 12/2016 | Johnson et al. |
| 9,530,262 B2 | 12/2016 | Johnson |
| 9,546,504 B2 | 1/2017 | Overgaard |
| 9,574,372 B2 | 2/2017 | Johnson et al. |
| 9,679,457 B1 * | 6/2017 | Welsh ............... G08B 25/008 |
| 9,725,927 B1 | 8/2017 | Cheng |
| 9,758,991 B2 | 9/2017 | Lin et al. |
| 10,017,963 B2 | 7/2018 | Johnson et al. |
| 10,024,081 B2 | 7/2018 | Li et al. |
| 10,037,636 B2 | 7/2018 | Ho et al. |
| 2001/0045803 A1 | 11/2001 | Cencur |
| 2002/0109582 A1 | 8/2002 | Mooney et al. |
| 2002/0140542 A1 | 8/2002 | Prokoski et al. |
| 2003/0084691 A1 | 5/2003 | Kato et al. |
| 2003/0114206 A1 | 6/2003 | Timothy et al. |
| 2003/0230124 A1 | 12/2003 | Johnson et al. |
| 2004/0011094 A1 | 1/2004 | Hsieh |
| 2004/0035160 A1 | 2/2004 | Meekma et al. |
| 2004/0183652 A1 | 9/2004 | Deng et al. |
| 2004/0257209 A1 | 12/2004 | Yang |
| 2005/0035848 A1 | 2/2005 | Syed et al. |
| 2005/0046545 A1 | 2/2005 | Skekloff et al. |
| 2005/0116480 A1 | 6/2005 | Deng et al. |
| 2005/0204787 A1 | 9/2005 | Ernst et al. |
| 2005/0237166 A1 | 10/2005 | Chen |
| 2005/0279823 A1 | 12/2005 | Mitchell |
| 2006/0000247 A1 | 1/2006 | Moon et al. |
| 2006/0001522 A1 | 1/2006 | Moon et al. |
| 2006/0022794 A1 | 2/2006 | Determan et al. |
| 2006/0092378 A1 | 5/2006 | Marsden et al. |
| 2006/0103545 A1 | 5/2006 | Tsou |
| 2006/0113368 A1 | 6/2006 | Dudley |
| 2006/0114099 A1 | 6/2006 | Deng et al. |
| 2006/0176146 A1 | 8/2006 | Krishan et al. |
| 2006/0266089 A1 | 11/2006 | Dimig |
| 2006/0273879 A1 | 12/2006 | Pudelko et al. |
| 2006/0283219 A1 | 12/2006 | Bendz et al. |
| 2007/0083921 A1 | 4/2007 | Parris et al. |
| 2007/0090921 A1 | 4/2007 | Fisher |
| 2007/0115094 A1 | 5/2007 | Gillert et al. |
| 2007/0126562 A1 | 6/2007 | Ku |
| 2007/0163863 A1 | 7/2007 | Mitchell et al. |
| 2007/0176739 A1 | 8/2007 | Raheman |
| 2007/0180869 A1 | 8/2007 | Geyer |
| 2007/0204663 A1 | 9/2007 | Lee |
| 2007/0214848 A1 | 9/2007 | Meyerle et al. |
| 2007/0226142 A1 | 9/2007 | Hanna et al. |
| 2007/0257773 A1 | 11/2007 | Hill et al. |
| 2007/0290793 A1 | 12/2007 | Tran |
| 2008/0061927 A1 | 3/2008 | Manton |
| 2008/0129059 A1 | 6/2008 | Chang |
| 2008/0134732 A1 | 6/2008 | Petersen |
| 2008/0186171 A1 | 8/2008 | Gates |
| 2008/0196457 A1 | 8/2008 | Goldman |
| 2008/0250716 A1 | 10/2008 | Ranaudo et al. |
| 2008/0252414 A1 | 10/2008 | Crigger et al. |
| 2008/0278335 A1 | 11/2008 | Welte |
| 2008/0289383 A1 | 11/2008 | Levine |
| 2008/0290990 A1 | 11/2008 | Schaffzin et al. |
| 2008/0303630 A1 | 12/2008 | Martinez |
| 2008/0314097 A1 | 12/2008 | Rohlfing et al. |
| 2009/0108596 A1 | 4/2009 | Terry et al. |
| 2009/0135015 A1 | 5/2009 | Dobson et al. |
| 2009/0151410 A1 | 6/2009 | Hapke |
| 2009/0173119 A1 | 7/2009 | Hunt et al. |
| 2009/0183541 A1 | 7/2009 | Sadighi et al. |
| 2009/0201127 A1 | 8/2009 | Stobbe et al. |
| 2009/0211319 A1 | 8/2009 | McCormack |
| 2009/0217447 A1 * | 9/2009 | Matsushita ............ A47K 13/24 |
| | | 4/420.5 |
| 2009/0223265 A1 | 9/2009 | Chang |
| 2009/0231132 A1 | 9/2009 | Shoenfeld |
| 2009/0249846 A1 | 10/2009 | Gokcebay |
| 2009/0256677 A1 | 10/2009 | Hein et al. |
| 2009/0273440 A1 | 11/2009 | Marschalek et al. |
| 2009/0280862 A1 | 11/2009 | Loughlin et al. |
| 2009/0293561 A1 | 12/2009 | Jakobsen et al. |
| 2009/0308116 A1 | 12/2009 | Lambrou |
| 2009/0320538 A1 | 12/2009 | Pellaton |
| 2010/0031713 A1 | 2/2010 | Brown et al. |
| 2010/0031714 A1 | 2/2010 | Brown et al. |
| 2010/0066507 A1 | 3/2010 | Myllymaki |
| 2010/0102927 A1 | 4/2010 | Monig |
| 2010/0126071 A1 | 5/2010 | Hill |
| 2010/0201536 A1 | 8/2010 | Robertson et al. |
| 2010/0218569 A1 | 9/2010 | Hunt et al. |
| 2010/0225123 A1 | 9/2010 | Chiang et al. |
| 2010/0259387 A1 | 10/2010 | Jiang |
| 2010/0300163 A1 | 12/2010 | Loughlin et al. |
| 2010/0307206 A1 | 12/2010 | Taylor et al. |
| 2010/0326146 A1 | 12/2010 | Powers et al. |
| 2010/0328089 A1 | 12/2010 | Eichenstein et al. |
| 2011/0005282 A1 | 1/2011 | Powers et al. |
| 2011/0043328 A1 * | 2/2011 | Bassali ............... G08C 17/02 |
| | | 340/5.71 |
| 2011/0056253 A1 | 3/2011 | Greiner et al. |
| 2011/0067308 A1 | 3/2011 | Hunt et al. |
| 2011/0084856 A1 | 4/2011 | Kleindienst et al. |
| 2011/0128143 A1 | 6/2011 | Daniel |
| 2011/0148631 A1 | 6/2011 | Lanham et al. |
| 2011/0148762 A1 * | 6/2011 | Hatambeiki ......... H01H 9/0235 |
| | | 345/158 |
| 2011/0172885 A1 | 7/2011 | Fawaz et al. |
| 2011/0185779 A1 | 8/2011 | Crass et al. |
| 2011/0193680 A1 | 8/2011 | Summerford et al. |
| 2011/0203331 A1 | 8/2011 | Picard et al. |
| 2011/0204656 A1 | 8/2011 | Lai |
| 2011/0252843 A1 | 10/2011 | Sumcad et al. |
| 2011/0255250 A1 | 10/2011 | Dinh et al. |
| 2011/0259059 A1 | 10/2011 | Wu et al. |
| 2011/0265527 A1 | 11/2011 | Saari |
| 2011/0265528 A1 | 11/2011 | Saari |
| 2011/0283755 A1 | 11/2011 | Chen |
| 2011/0291798 A1 | 12/2011 | Schibuk |
| 2012/0011907 A1 | 1/2012 | Sprenger et al. |
| 2012/0031153 A1 | 2/2012 | Conti |
| 2012/0032775 A1 | 2/2012 | Kikuchi |
| 2012/0086569 A1 | 4/2012 | Golden |
| 2012/0096909 A1 | 4/2012 | Hart et al. |
| 2012/0119877 A1 | 5/2012 | Ng et al. |
| 2012/0154115 A1 | 6/2012 | Herrala |
| 2012/0169453 A1 | 7/2012 | Bryla et al. |
| 2012/0186308 A1 | 7/2012 | Garthe |
| 2012/0222103 A1 | 8/2012 | Bliding et al. |
| 2012/0227450 A1 | 9/2012 | Ufkes |
| 2012/0229251 A1 | 9/2012 | Ufkes |
| 2012/0234058 A1 | 9/2012 | Neil et al. |
| 2012/0280789 A1 | 11/2012 | Gerhardt et al. |
| 2012/0293655 A1 | 11/2012 | Loughlin et al. |
| 2012/0306617 A1 | 12/2012 | Tung |
| 2012/0309364 A1 | 12/2012 | Quady |
| 2012/0324968 A1 | 12/2012 | Goren et al. |
| 2013/0008213 A1 | 1/2013 | Brown et al. |
| 2013/0014549 A1 | 1/2013 | Cavanaugh |
| 2013/0027180 A1 | 1/2013 | Lakamraju et al. |

(56) References Cited

U.S. PATENT DOCUMENTS

| | | |
|---|---|---|
| 2013/0086956 A1 | 4/2013 | Nave |
| 2014/0157842 A1 | 6/2014 | Almomani et al. |
| 2014/0184922 A1* | 7/2014 | Schafer ............ H04N 21/44222 |
| | | 348/734 |
| 2014/0260448 A1 | 9/2014 | Beck et al. |
| 2014/0300116 A1 | 10/2014 | Hellwig et al. |
| 2015/0159411 A1 | 6/2015 | Son et al. |
| 2015/0228132 A1* | 8/2015 | Geerlings ............... G08C 17/02 |
| | | 340/5.22 |
| 2015/0269799 A1 | 9/2015 | Martinez et al. |
| 2016/0032621 A1 | 2/2016 | Johnson et al. |
| 2016/0047145 A1 | 2/2016 | Johnson et al. |
| 2016/0307380 A1 | 10/2016 | Ho et al. |
| 2016/0319569 A1 | 11/2016 | Johnson et al. |
| 2016/0326773 A1 | 11/2016 | Tobias et al. |
| 2017/0018956 A1 | 1/2017 | Geiszler |
| 2017/0076524 A1* | 3/2017 | Yoshihara ............... B60R 16/02 |
| 2017/0114577 A1 | 4/2017 | Beshke, Sr. et al. |
| 2017/0204636 A1 | 7/2017 | Sack |
| 2017/0284131 A1 | 10/2017 | Lin et al. |
| 2017/0301166 A1 | 10/2017 | Earles et al. |
| 2017/0306648 A1 | 10/2017 | Ramsauer et al. |
| 2017/0352216 A1 | 12/2017 | Donovan |
| 2017/0358160 A1 | 12/2017 | Gardiner et al. |
| 2018/0073274 A1 | 3/2018 | Johnson et al. |
| 2018/0108192 A1 | 4/2018 | Ho et al. |
| 2018/0135336 A1 | 5/2018 | Johnson et al. |
| 2018/0135337 A1 | 5/2018 | Johnson et al. |
| 2018/0171660 A1 | 6/2018 | Snider |
| 2018/0179786 A1 | 6/2018 | Johnson |
| 2019/0249481 A1* | 8/2019 | Cate ........................ G07C 9/29 |

FOREIGN PATENT DOCUMENTS

| | | |
|---|---|---|
| CN | 1947158 A | 4/2007 |
| CN | 101046129 A | 10/2007 |
| CN | 102747893 A | 10/2012 |
| EP | 0 730 073 A2 | 9/1996 |
| EP | 1 710 753 A2 | 10/2006 |
| GB | 2 227 052 A | 7/1990 |
| KR | 20-0462168 Y1 | 8/2012 |
| KR | 200462168 Y1 | 8/2012 |
| TW | 472217 B | 1/2002 |
| WO | 93/09319 A1 | 5/1993 |
| WO | 2011/109005 A1 | 9/2011 |

OTHER PUBLICATIONS

AC Type 8 Disabled Persons Toilet System (DPTS), http://www.autodoorsprings.co.uk/disabled_persons_toilet_system.html Website Material on Touch Sensor, 2 pages (Oct. 20, 2010).

Search Report for Taiwanese Patent Application No. 106109470, dated Feb. 1, 2021.

* cited by examiner

GARAGE DOOR OPENER WITH TOUCH SENSOR AUTHENTICATION

RELATED APPLICATIONS

This application is a National Stage Application of PCT/US2017/023311, filed Mar. 21, 2017, which claims the benefit of U.S. Provisional Application Ser. No. 62/311,552, filed Mar. 22, 2016, which applications are incorporated herein by reference. To the extent appropriate, a claim of priority is made to each of the above disclosed applications.

TECHNICAL FIELD

The present disclosure relates generally to garage door openers. In particular, the present disclosure is directed to a garage door opener with a touch surface that initiates a wireless authentication process.

BACKGROUND

The garage door is a main point of entry and egress for many people. In most cases, the garage door is activated by a mechanical switch on the interior of the garage or by a remote signaling device located in the user's car. In other cases, the garage door can be controlled with a remote keypad or mechanical key cylinder mounted on the exterior frame of the door frame. However, there is a need for a remote garage door controller that adds convenience and security over conventional keypads used with garage doors.

SUMMARY

According to one aspect, this disclosure provides a remote control unit for a garage door having a garage door opener. The remote control unit includes a controller, at least one wireless communication unit in electrical communication with the controller and a user interface in electrical communication with the controller. In some embodiments, the user interface includes a wireless authentication activation element that is configured to detect user-actuation of the wireless authentication activation element. The controller is configured to transmit a wireless control signal to open/close a garage door responsive to receiving a valid authentication code via the wireless communication unit. Typically, the controller is configured to receive a wireless authentication code responsive to actuation of the wireless authentication activation element.

According to another aspect, this disclosure provides a method of remotely controlling a garage door having a garage door opener. The method includes the step of detecting, with an electronic sensor, a touch event on a touch surface. A wireless authentication process is initiated responsive to detection of a touch event. The method includes receiving via a wireless communication an electronic authentication code. A determination is made whether the electronic authentication code is valid. In response to determining that the electronic authentication code is valid, a wireless control signal is transmitted to open or close a garage door. If a determination is made that the electronic authentication code is invalid, access is denied.

BRIEF DESCRIPTION OF THE FIGURES

The detailed description makes reference to the accompanying figures in which.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
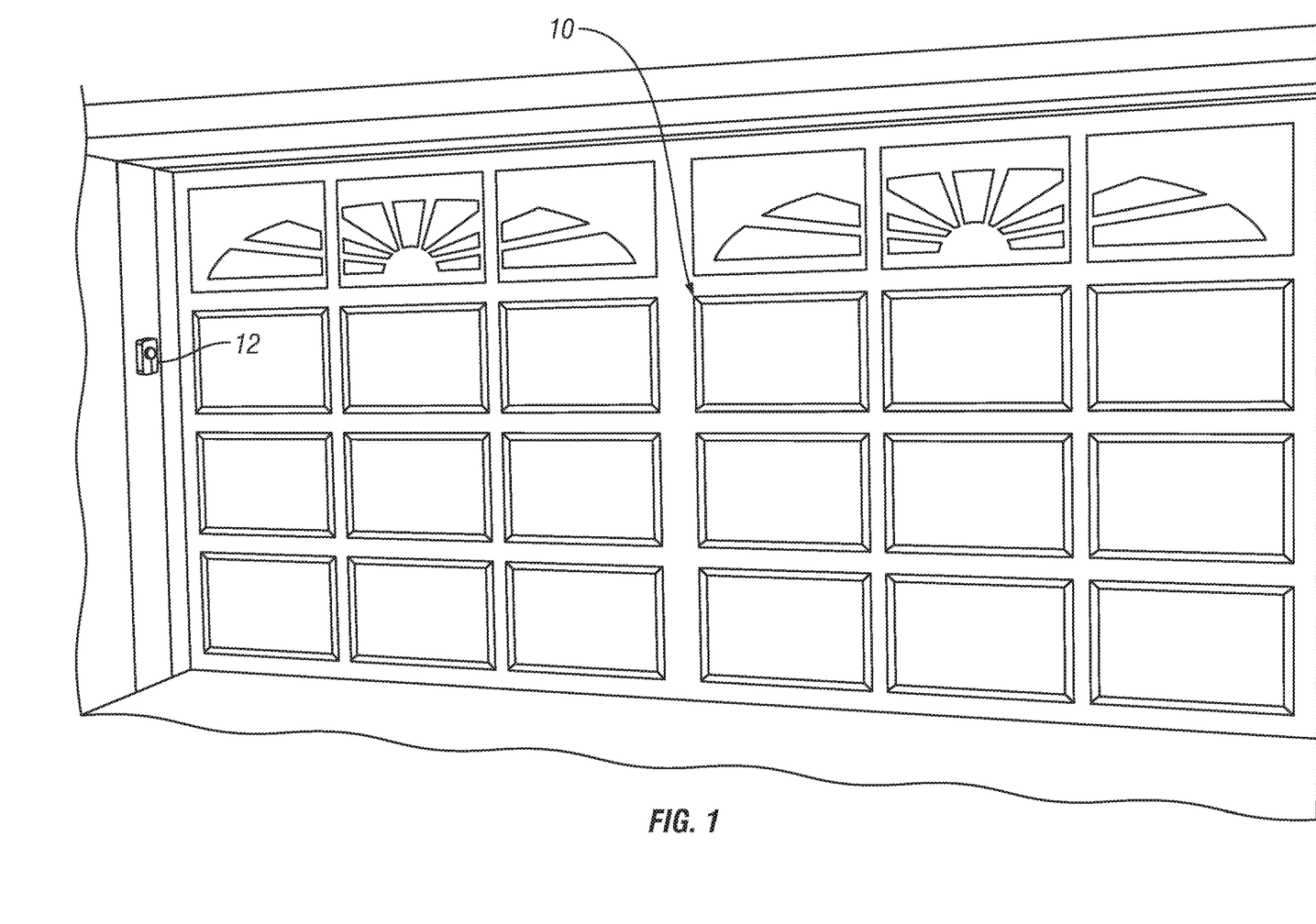
FIG. 1 is a perspective view of garage door controlled by a garage door opener according to an embodiment of the disclosure.

FIG. 1 shows an example garage door 10 the opening and closing of which is controlled, at least in part, by a remote control unit 12. The garage door 10 is connected with a garage door opener (not shown) that opens/closes the garage door 10 in a conventional manner, such as with a belt-drive or chain-drive system. The garage door opener is in wireless communication with the remote control unit 12 and is configured to open/close the garage door 10 based on a control signal wirelessly received from the remote control unit 12. For example, the remote control unit 12 could send a wireless command signal to the garage door opener to open/close the garage door 10. A double garage door is shown for purposes of illustration, but the type, size and shape of the garage door 10 that is controlled by the remote control unit 12 could vary depending on the circumstances.

Figure 2:
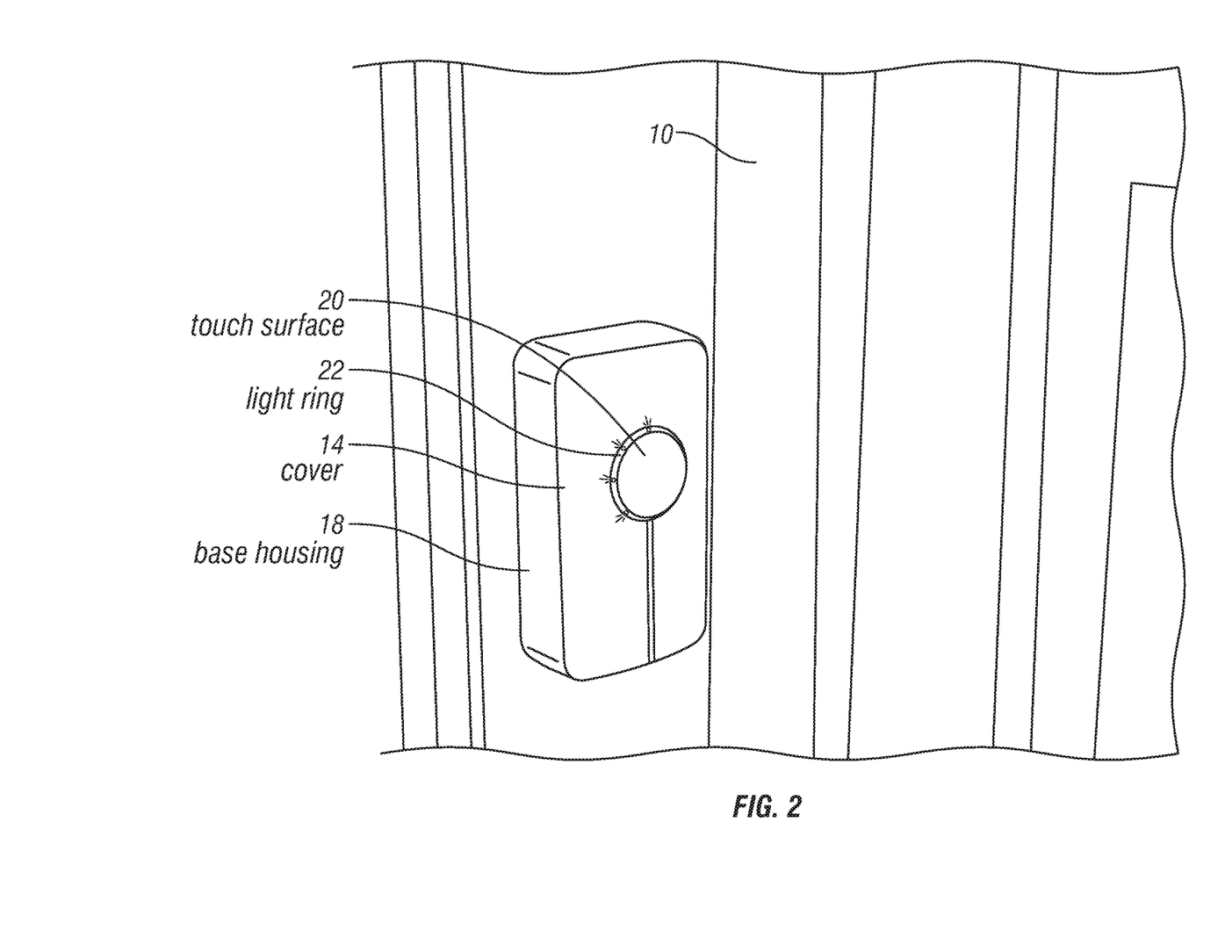
FIG. 2 is a perspective view of the garage door opener shown in FIG. 1.
Figure 3:
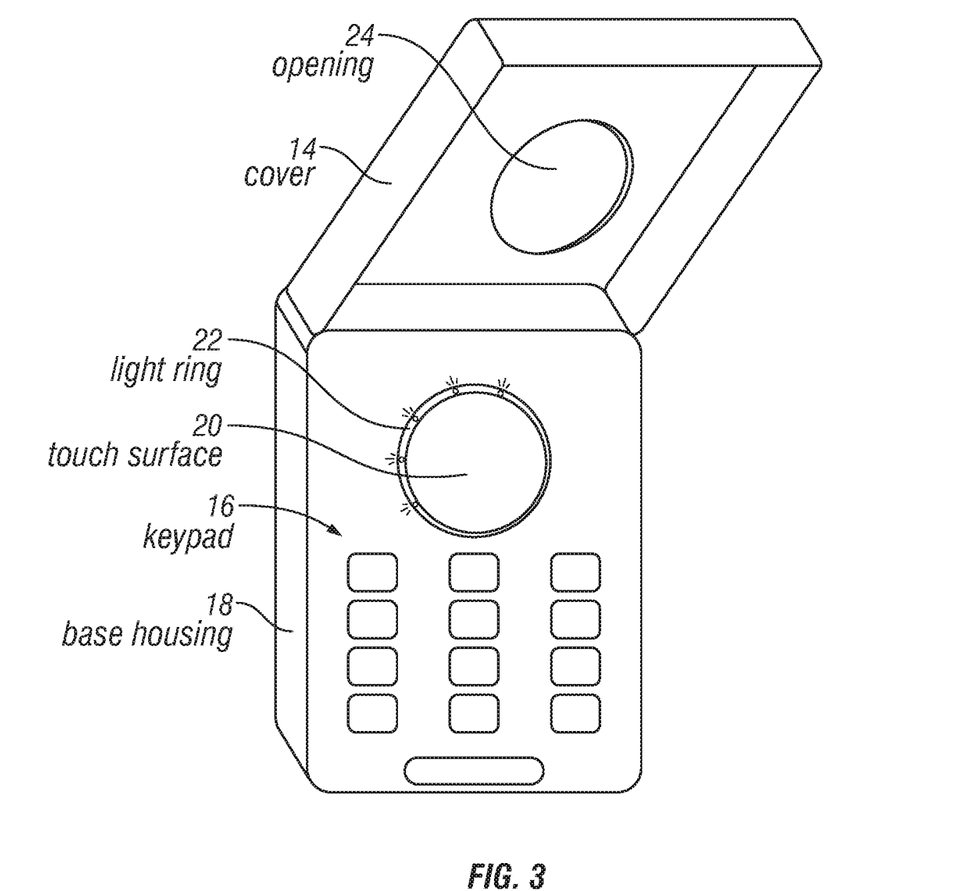
FIG. 3 is a perspective view of the garage door opener shown in FIG. 2 with a cover in an open position.

FIGS. 2 and 3 illustrate the example remote control unit 12 with a cover 14 in a closed position and in an open position to reveal a keypad 16, respectively. In the embodiment shown, the cover 14 is pivotally connected to a base housing 18. Although the cover 14 pivots generally about a horizontal axis in the example shown, one skilled in the art should appreciate the cover 14 could pivot about the vertical axis or otherwise be connected to the base housing 18 to aid in weatherproofing. In some embodiments, the cover 14 may be optional, such as if the base housing 18 is weatherproof; in some embodiments, the keypad and/or wireless authentication activation element could be on the base housing 18 and no cover 14 may be provided.

As shown, the remote control unit 12 includes a wireless authentication activation element, which is a touch surface 20 in the embodiment shown that can be used to initiate authentication of the user, such as through wireless communication of an electronic authentication key. The touch surface 20 is shown for purposes of example, but the wireless authentication activation element could be embodied as a touch sensor, proximity sensor, a physical button, a physical switch, a piezo element, inductive element or a resistive element or other element that could be user-selected or detect the user's presence in proximity to the remote control unit 12. Although the touch surface 20 is circular in the example shown, one skilled in the art should appreciate that the touch surface could be any desired shape. In some cases, the touch surface 20 could be a capacitive touch surface in which user-selection of the surface 20 could be detected by the remote control unit 12 to initiate an authentication process. In some embodiments, the remote control unit 12 is configured to perform a wireless authentication process, such as using Bluetooth™ communications (or some other wireless protocol), with a key fob or mobile device to determine whether the user is authenticated. If the user is authenticated based on wireless communications with the user's key fob or wireless device, the remote control unit 12 will transmit a wireless control signal to the garage door opener to open/close the garage door 10.

In the embodiment shown, the remote control unit includes a light communication device 22 that is configured to communicate status information and/or operational information to the user concerning the remote control unit 12 and/or the garage door 10. For example, the light communication device 22 could light up to indicate that the key fob or mobile device of the user is in range of the remote control unit 12. In some cases, the light communication device 22 could change colors and/or have other animations based on operation, such as opening/closing of door. In the example shown, the light communication device 22 has a ring-like shape that surrounds the touch surface 20. However, the light communication device 22 could be any shape depending on the circumstances.

As shown, the cover 14 includes an opening 24 (see FIG. 2) sized to receive the touch surface 20 so that the touch surface 20 is accessible therethrough. With this embodiment, the user would not need to open the cover 14 to open/close the garage door 10. Instead, the user could merely touch the touch surface 20 with a key fob or mobile device in the user's pocket (or bag or other area) to open/close the garage door 10. By touching the touch surface 20, this will cause the remote control unit 12 to initiate communications with the key fob or mobile device for purposes of authentication. If the key fob or mobile device is authenticated, the remote control unit 12 would then transmit a wireless control signal to the garage door opener, which would open/close the garage door 10.

FIG. 3 shows the remote control unit 12 with the cover 14 in the open position, which reveals the keypad 16. With the cover 14 in the open position, the user could either use the touch surface 20 or the keypad 16 for authentication to open/close the garage door 10. The keypad 16 would operate as a conventional keypad in which the user could select an open/close button upon entering a pin code. The remote control unit 12 would determine whether the pin code is valid, and if so, transmit a signal the garage door opener to open/close the garage door 10.

Figure 4:
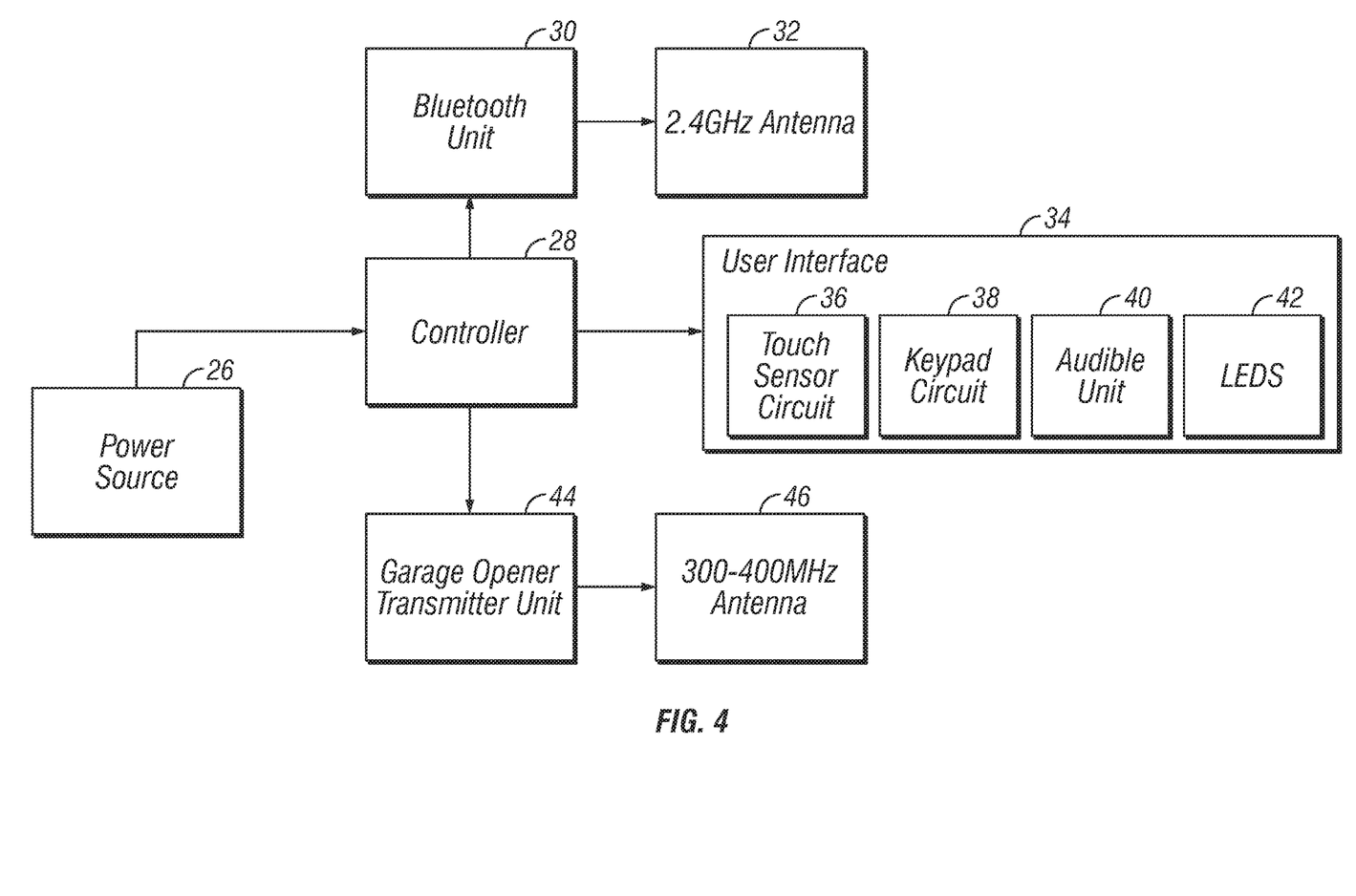
FIG. 4 is a simplified block diagram of a garage door opener according to an embodiment of the disclosure.

Referring to FIG. 4, there is shown a simplified block diagram showing an embodiment of the remote control unit 12. In this embodiment, the remote control unit 12 includes a power source 26, such as batteries or a hardwired power source, which provides electrical power to electrical components in the remote control unit 12. As shown, the remote control unit 12 includes a controller 28 that is configured to control operation of the remote control unit 12. The controller 28 may be embodied as a single or multi-core processor(s), microcontroller, or other processor or processing/controlling circuit. The controller 28 is electrically connected to a Bluetooth™ unit 30, which is configured to send and receive wireless communications using the Bluetooth™ protocol via a 2.4 GHz antenna 32. Although the Bluetooth™ unit 30 is shown for purposes of example, other protocols could be used to wirelessly authenticate the user.

In the embodiment shown, the controller 28 is electrically connected with a user interface 34. As this example, the user interface 34 includes a touch sensor circuit 36, a keypad circuit 38, an audible unit 40 and LEDs 42. The touch sensor circuit 36 is configured to detect a user touching the touch surface 20. Upon detecting such a touch of the touch surface 20, the touch sensor circuit 36 would provide a signal to the controller 28 indicating that the touch surface 20 has been actuated. The controller 28, in turn, would send a wireless communication with the Bluetooth™ unit 30 to authenticate the user's key fob or mobile device using Bluetooth™ communications. The keypad circuit 38 is configured to provide input received through the keypad 16 to the controller 28 for authentication (or other purposes for which the keypad 16 could be used). In this example, the user interface 34 includes an audible unit 40, which could be configured to generate sounds as desired during operation of the remote control unit 12. The controller 28 could be configured to turn on/off the LEDs 42 as desired, such as for backlighting of the keypad 16, for the light communication device 22, etc.

As shown, the controller 28 is electrically connected to a garage opener transmitter unit 44, which is configured to send and receive wireless communications to the garage door opener via a 300-400 MHz antenna 46 to open/close the garage door 10. Many garage door openers operate in the 300-400 MHz spectrum, which is why the antenna in that spectrum is shown for purposes of example. However, the garage opener transmitter unit could be configured to transmit a control signal to the garage door opener on any frequency as desired.

Figure 5:
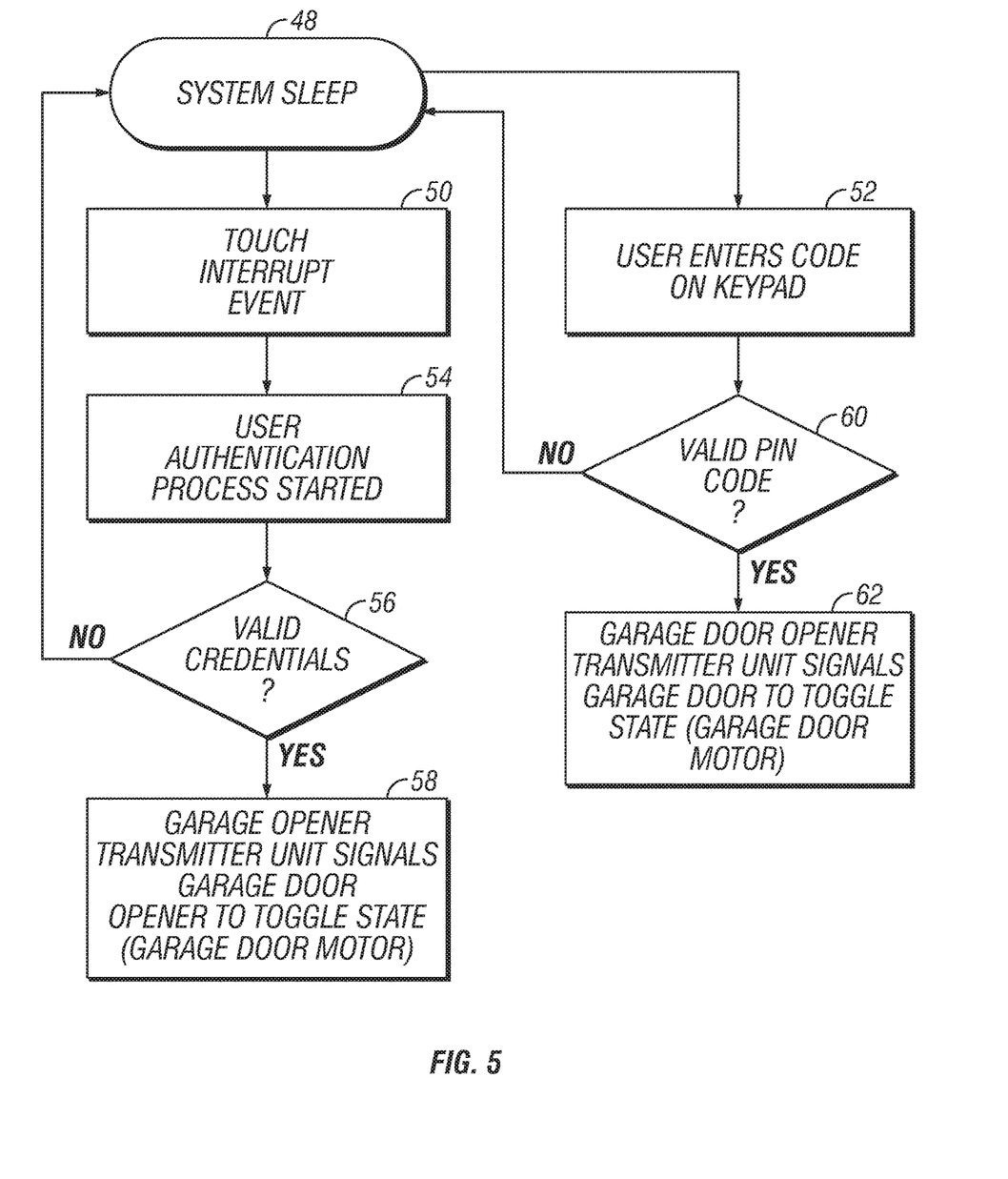
FIG. 5 is a simplified flow chart showing example operations that could be performed by the garage door opener according to an embodiment of the disclosure.

FIG. 5 is a flow chart showing example operations that could be performed by the remote control unit 12. In this example, the remote control unit 12 is in sleep mode (Block 48) until the touch sensor circuit 36 detects a user-selection of the touch surface 20 (Block 50) or the user enters a pin code on the keypad 16 (Block 52). If the user selects the touch surface 20, the controller 28 initiates a user authentication process (Block 54). In some embodiments, the controller 28 wirelessly receives an electronic authentication code from a key fob or mobile device. The controller 28 determines whether the electronic authentication code is valid (Block 56), and if so, transmits a control signal via the garage opener transmitter unit 44 to the garage door opener to open/close the garage door 10 (Block 58). If the user enters a pin code on the keypad (Block 52), the controller 28 determines whether the code is valid (Block 60). If so, the remote control unit 12 transmits a control signal via the garage opener transmitter unit 44 to the garage door opener to open/close the garage door 10 (Block 62).

EXAMPLES

Illustrative examples of the remote control unit for a garage door disclosed herein are provided below. An embodiment of the remote control unit may include any one or more, and any combination of, the examples described below.

Example 1 includes a remote control unit for a garage door having a garage door opener, the remote control unit comprising a controller, at least one wireless communication unit in electrical communication with the controller, a user interface in electrical communication with the controller, wherein the user interface includes a wireless authentication activation element that is configured to detect user-actuation of the wireless authentication activation element, wherein the controller is configured to transmit a wireless control signal to open/close a garage door responsive to receiving a valid authentication code via the wireless communication unit, and wherein, responsive to actuation of the wireless authentication activation element, the controller is configured to receive a wireless authentication code.

Example 2 includes the subject matter of Example 1, and wherein the wireless authentication activation element is a touch sensor circuit with a touch surface and wherein the controller is configured to receive a wireless authentication code responsive to user-selection of the touch surface.

Example 3 includes the subject matter of Example 1, and wherein the wireless authentication activation element is one or more of a mechanical button, a mechanical switch, a touch sensor, a proximity sensor, a capacitive sensor, inductive sensor, a piezo element, and/or a resistive element.

Example 4 includes the subject matter of Example 1, and wherein the at least one wireless communication unit includes a first wireless communication unit and a second wireless communication unit.

Example 5 includes the subject matter of Example 4, and wherein the first wireless communication unit is configured to communicate at a frequency of approximately 2.4 6 GHz ISM Band, 915 MHz ISM Band, or Cellular Bands.

Example 6 includes the subject matter of Example 5, and wherein the first wireless communication unit is configured to communicate using a Bluetooth, Zigbee, Zwave, WiFi protocol.

Example 7 includes the subject matter of Example 4, and wherein the first wireless communication unit is configured to communicate at a frequency of approximately 300-400 MHz, ISM Band, or Cellular Bands.

Example 8 includes the subject matter of Example 1, and wherein the user interface further includes a keypad for entering an authentication code.

Example 9 includes the subject matter of Example 8, and further comprising a cover movable between a first position that covers the keypad and a second position that does not cover the keypad.

Example 10 includes the subject matter of Example 9, and wherein the cover does not cover the touch surface in either the first position or the second position.

Example 11 includes the subject matter of Example 9, and wherein the cover includes an opening dimensioned to receive the touch surface.

Example 12 includes the subject matter of Example 11, and wherein the touch surface extends through the opening in the cover when the cover is in the first position.

Example 13 includes the subject matter of Example 1, and further comprising a light communication unit surrounding the touch surface.

Example 14 includes the subject matter of Example 13, and wherein the light communication unit has a ring-like shape.

Example 15 is a method of remotely controlling a garage door having a garage door opener. The method comprises the steps of detecting, with an electronic sensor, a touch event on a touch surface, initiating a wireless authentication process responsive to detection of a touch event, receiving via a wireless communication an electronic authentication code, determining whether the electronic authentication code is valid, responsive to determining that the electronic authentication code is valid, transmitting a wireless control signal to open or close a garage door, and responsive to determining that the electronic authentication code is invalid, denying access.

Example 16 includes the subject matter of Example 15, further comprising receiving the electronic authentication from user-selected input on a keypad.

Example 17 includes the subject matter of Example 15, and wherein the electronic authentication code is wirelessly received via a Bluetooth, Zwave, Zigbee, WiFi communication.

Example 18 includes the subject matter of Example 15, and wherein the touch surface is metal.

Example 19 includes the subject matter of Example 18, and wherein the touch surface is a mechanical button, a mechanical switch, a touch sensor, a proximity sensor, a capacitive sensor, inductive sensor, a piezo element, and/or a resistive element.

What is claimed is:

1. A remote control unit for a garage door having a garage door opener, the remote control unit comprising:
   a controller;
   a first wireless communication unit and a second wireless communication unit in electrical communication with the controller, the first wireless communication unit being operable using a first wireless protocol and the second wireless communication unit being operable using a second wireless protocol different from the first wireless protocol;
   a user interface in electrical communication with the controller, wherein the user interface includes a wireless authentication activation element comprising a touch surface sensor that is configured to receive a wireless authentication code responsive to user-selection of the touch surface sensor to detect user-actuation of the wireless authentication activation element and a light communication unit adjacent to the wireless authentication activation element, the light communication unit configured to actuate in a pre-determined pattern to communicate status information and/or operational information of the garage door, and wherein the light communication device indicates when the first wireless communication unit of the controller is ready to receive the wireless authentication code;

wherein the second wireless communication unit of the controller is configured to transmit a wireless control signal to open/close the garage door responsive to receiving a valid wireless authentication code via the first wireless communication unit; and wherein, responsive to user-selection of the touch surface sensor, the controller is configured to receive the wireless authentication code via the first wireless protocol.

2. The remote control unit of claim 1, wherein the second wireless communication unit is configured to communicate at a radio frequency of approximately 2.46 GHz ISM Band, 915 MHz ISM Band, or Cellular Bands.

3. The remote control unit of claim 2, wherein the first wireless communication unit is configured to communicate using at least one of a Bluetooth, a Zigbee, a Zwave, and a WiFi protocol.

4. The remote control unit of claim 1, wherein the second wireless communication unit is configured to communicate at a radio frequency of at least one of approximately 300-400 MHz, ISM Bands, and Cellular Bands.

5. The remote control unit of claim 1, wherein the user interface further includes a keypad for entering the wireless authentication code.

6. The remote control unit of claim 5, further comprising a cover movable between a first position that covers the keypad and a second position that does not cover the keypad.

7. The remote control unit of claim 6, wherein the cover does not cover the wireless authentication activation element in either the first position or the second position.

8. The remote control unit of claim 6, wherein the cover includes an opening dimensioned to receive the wireless authentication activation element.

9. The remote control unit of claim 8, wherein the wireless authentication activation element extends through the opening in the cover when the cover is in the first position.

10. The remote control unit of claim 1, wherein the light communication unit has a ring-like shape.

11. The remote control unit of claim 1, wherein the light communication unit can change colors or change animation in response to a change of the garage door status.

12. A method of remotely controlling a garage door having a garage door opener, the method comprising the steps of:
indicating, via a light communication unit, a readiness to receive an electronic authentication code;
detecting, with an electronic sensor, a touch event on a touch surface sensor;
initiating a wireless authentication process responsive to detection of a touch event;
receiving, via a first wireless communication protocol at a first wireless communication unit, the electronic authentication code;
determining whether the electronic authentication code is valid;
responsive to determining that the electronic authentication code is valid, transmitting by a second wireless communication unit, a wireless control signal of a second wireless communication protocol different than the first wireless communication protocol to open or close the garage door and displaying a first pre-determined pattern on the light communication unit associated with the electronic sensor; and
responsive to determining that the electronic authentication code is invalid, denying access and displaying a second pre-determined pattern on the light communication unit associated with the electronic sensor, wherein the second pre-determined pattern is different than the first pre-determined pattern.

13. The method of claim 12, further comprising receiving the electronic authentication code from user-selected input on a keypad.

14. The method of claim 12, wherein the touch surface sensor is metal.

15. The method of claim 12, wherein at least a portion of the light communication unit is arranged in a ring-like shape.

16. The method of claim 12, wherein the transmitting the radio frequency communication protocol communicates at a radio frequency of approximately 300-400 MHz, 2.46 GHz ISM Band, 915 MHz ISM Band, or Cellular Bands.

17. A remote control unit for a garage door having a garage door opener, the remote control unit comprising:
a controller;
a first wireless communication unit and a second wireless communication unit in electrical communication with the controller;
a user interface in electrical communication with the controller, wherein the user interface includes a wireless authentication activation element comprising a touch surface sensor that is configured to detect user-actuation of the wireless authentication activation element, wherein the first wireless communication unit utilizes a first wireless protocol and the second wireless communication unit uses a second wireless protocol, wherein the first and second wireless protocols are different;
a keypad for entering an authentication code;
a light communication unit adjacent to the wireless authentication activation element, wherein the light communication unit indicates when the controller is ready to receive a wireless authentication code;
wherein the remote control unit is configured to perform a wireless authentication process to determine whether a user is authenticated;
wherein the controller is configured to transmit a wireless control signal via the second communication protocol to open/close the garage door responsive to receiving a valid wireless authentication code via the first wireless communication unit; and
wherein, responsive to user-selection of the touch surface sensor or activation of the keypad, the controller is configured to receive the wireless authentication code.

18. The remote control unit of claim 17, wherein at least a portion of the light communication unit is arranged in a ring-like shape.

19. The remote control unit of claim 17, wherein the second wireless communication unit is configured to communicate at a radio frequency of approximately 300-400 MHz, 2.46 GHz ISM Band, 915 MHz ISM Band, or Cellular Bands.

20. The remote control unit of claim 17, wherein the first wireless communication unit is configured to communicate using at least one of a Bluetooth, a Zigbee, a Zwave, and a WiFi protocol.

* * * * *